United States Patent
Miyano et al.

(10) Patent No.: US 9,855,704 B2
(45) Date of Patent: Jan. 2, 2018

(54) POWDER RECOATER

(71) Applicant: TECHNOLOGY RESEARCH ASSOCIATION FOR FUTURE ADDITIVE MANUFACTURING, Tokyo (JP)

(72) Inventors: Hideaki Miyano, Yokohama (JP); Yoshikazu Ooba, Yokohama (JP); Yousuke Katou, Yokohama (JP); Koukichi Suzuki, Yokohama (JP); Yuya Daicho, Yokohama (JP)

(73) Assignee: TECHNOLOGY RESEARCH ASSOCIATION FOR FUTURE ADDITIVE MANUFACTURING, Tokyo (JP)

(*) Notice: Subject to any disclaimer, the term of this patent is extended or adjusted under 35 U.S.C. 154(b) by 0 days.

(21) Appl. No.: 14/760,134

(22) PCT Filed: Feb. 27, 2015

(86) PCT No.: PCT/JP2015/055964
§ 371 (c)(1),
(2) Date: Jul. 9, 2015

(87) PCT Pub. No.: WO2016/135974
PCT Pub. Date: Sep. 1, 2016

(65) Prior Publication Data
US 2016/0311164 A1    Oct. 27, 2016

(51) Int. Cl.
*B29C 67/00*    (2017.01)
*B29C 64/329*   (2017.01)
(Continued)

(52) U.S. Cl.
CPC ............. *B29C 64/329* (2017.08); *B05D 1/12* (2013.01); *B22F 3/105* (2013.01); *B28B 13/02* (2013.01);
(Continued)

(58) Field of Classification Search
None
See application file for complete search history.

(56) References Cited

U.S. PATENT DOCUMENTS 3,988,096 A * 10/1976 Papalexis ............... A21C 11/10
                                                             222/340
4,503,995 A *  3/1985 Anderson ............... A21C 5/04
                                                             222/219
(Continued)

FOREIGN PATENT DOCUMENTS

| JP | 7-76026 A | 3/1995 |
| JP | 2000-117721 A | 4/2000 |

(Continued)

OTHER PUBLICATIONS

International Search Report dated Jun. 11, 2015 for Application No. PCT/JP2015/055964.
(Continued)

*Primary Examiner* — Matthew Daniels
*Assistant Examiner* — Manley L Cummins, IV
(74) *Attorney, Agent, or Firm* — Ladas & Parry LLP

(57) ABSTRACT

A powder is spread in two directions, that is, the advancement and retraction directions of a powder recoater. The powder recoater according to this invention includes a hopper that stores a powder, and a cylindrical powder supplier that has a side surface close to or in contact with the bottom surface of the hopper and includes a supply path for the powder. The powder recoater according to this invention further includes a pivoting unit that causes the powder (Continued)

supplier to pivot. In the powder recoater according to this invention, the center axis of the supply path is displaced from the center axis of the powder supplier in the radial direction of the powder supplier.

10 Claims, 5 Drawing Sheets

(51) Int. Cl.
| | |
|---|---|
| *B29C 64/255* | (2017.01) |
| *B29C 64/165* | (2017.01) |
| *B29C 64/153* | (2017.01) |
| *B22F 3/105* | (2006.01) |
| *B29C 31/02* | (2006.01) |
| *B28B 13/02* | (2006.01) |
| *B33Y 30/00* | (2015.01) |
| *B33Y 10/00* | (2015.01) |
| *B05D 1/12* | (2006.01) |
| *B29C 64/343* | (2017.01) |

(52) U.S. Cl.
CPC ............ *B29C 31/02* (2013.01); *B29C 64/153* (2017.08); *B29C 64/165* (2017.08); *B29C 64/255* (2017.08); *B29C 67/00* (2013.01); *B33Y 10/00* (2014.12); *B33Y 30/00* (2014.12); *B29C 64/343* (2017.08)

(56) References Cited

U.S. PATENT DOCUMENTS

| | | | | |
|---|---|---|---|---|
| 4,954,301 A * | 9/1990 | Saeki | ...................... | B29C 45/76 264/328.4 |
| 5,071,337 A * | 12/1991 | Heller | .................... | B29C 64/135 118/603 |
| 5,204,055 A * | 4/1993 | Sachs | ...................... | B05C 19/04 264/113 |
| 5,213,817 A * | 5/1993 | Pelley | ............... | A61F 13/15658 118/308 |
| 5,344,299 A * | 9/1994 | Takeuchi | ............... | B29C 31/048 264/142 |
| 5,387,380 A * | 2/1995 | Cima | ...................... | B05C 19/04 264/109 |
| 5,647,931 A * | 7/1997 | Retallick | .................. | B22F 3/004 156/273.3 |
| 5,934,343 A * | 8/1999 | Gaylo | ..................... | B22F 3/004 141/12 |
| 6,213,168 B1 * | 4/2001 | Gaylo | ..................... | B22F 3/004 141/12 |
| 7,799,253 B2 * | 9/2010 | Hochsmann | .......... | B29C 64/153 118/308 |
| 2006/0105102 A1 * | 5/2006 | Hochsmann | ............. | B05D 1/26 427/180 |
| 2006/0204603 A1 * | 9/2006 | Leuterer | ............... | B29C 64/153 425/174.4 |
| 2006/0214335 A1 * | 9/2006 | Cox | ........................ | B01F 3/188 264/497 |
| 2006/0214355 A1 * | 9/2006 | Fukao | .................. | B65H 3/0661 271/10.11 |
| 2008/0006334 A1 * | 1/2008 | Davidson | ................ | B29C 64/35 137/571 |
| 2008/0260945 A1 * | 10/2008 | Ederer | .................... | B05C 19/04 427/212 |
| 2009/0011066 A1 * | 1/2009 | Davidson | ................ | B29C 41/12 425/215 |
| 2011/0015416 A1 * | 1/2011 | Ueyama | .................... | A23D 9/00 554/63 |
| 2012/0097258 A1 * | 4/2012 | Hartmann | ............... | B29C 64/20 137/14 |

FOREIGN PATENT DOCUMENTS

| | | |
|---|---|---|
| JP | 2005-81174 A | 3/2005 |
| JP | 2014-188758 A | 10/2014 |
| WO | WO 2005/080010 A1 | 9/2005 |
| WO | WO 2010/149133 A1 | 12/2010 |

OTHER PUBLICATIONS

J-PlatPat English abstract of JP JP 2014-188758 A.
J-PlatPat English abstract of JP JP 2005-81174 A.
J-PlatPat English abstract of JP JP 7-76026 A.
J-PlatPat English abstract of JP JP 2000-117721 A.

* cited by examiner

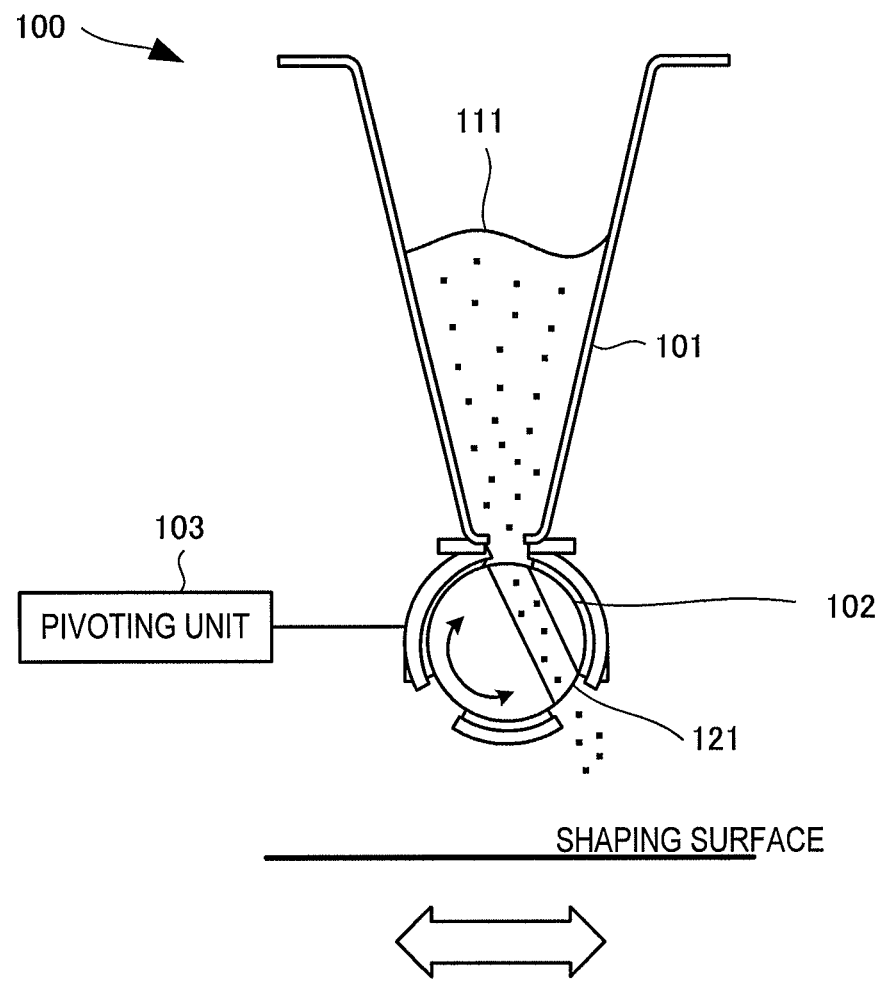
F I G. 1

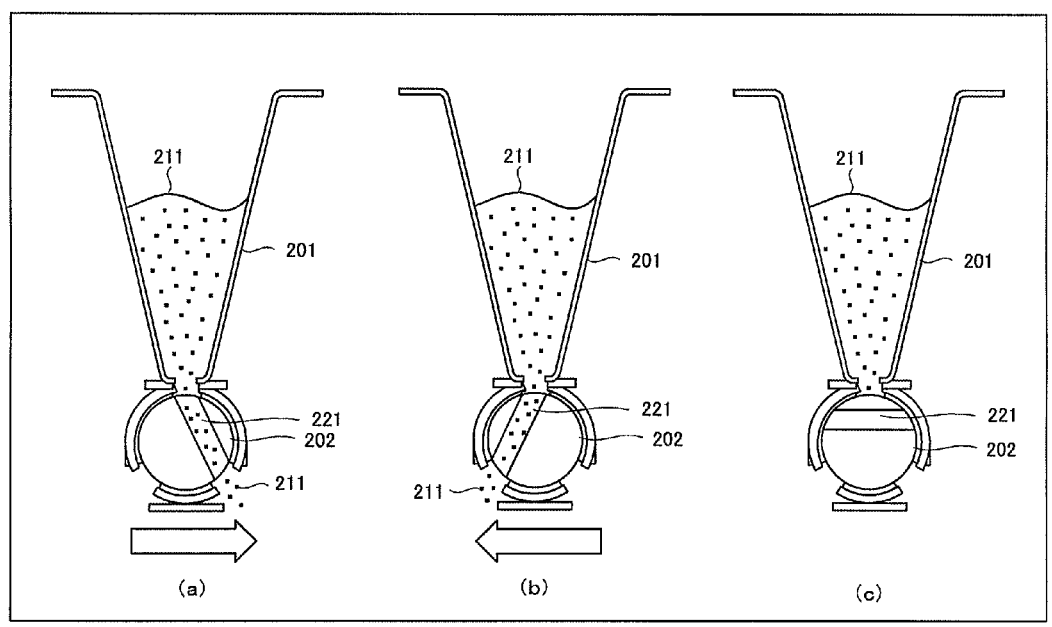
F I G. 4

POWDER RECOATER

TECHNICAL FIELD

The present invention relates to a powder recoater.

BACKGROUND ART

In the above technical field, patent literature 1 discloses a technique of vibrating a recoater and spreading a powder. Patent literature 2 discloses a technique of, when spreading a powder, applying a positive pressure to a recoater, and when stopping the spread of the powder, applying a negative pressure to the recoater.

CITATION LIST

Patent Literature

Patent literature 1: International Publication WO 2005/080010
Patent literature 2: International Publication WO 2010/149133

SUMMARY OF THE INVENTION

Technical Problem

In the techniques described in these literatures, however, a powder can be spread in only one direction, for example, the advancement direction of the powder recoater, and the powder cannot be spread in two directions, that is, the advancement and retraction directions of the powder recoater.

The present invention enables to provide a technique of solving the above-described problem.

Solution to Problem

One aspect of the present invention provides a powder recoater comprising:
a hopper that stores a powder;
a cylindrical powder supplier that has a side surface close to or in contact with a bottom surface of the hopper and includes a supply path for the powder; and
a pivoting unit that causes the powder supplier to pivot,
wherein a center axis of the supply path is displaced from a center axis of the powder supplier in a radial direction of the powder supplier.

Advantageous Effects of Invention

According to the present invention, a powder can be spread in two directions, that is, the advancement and retraction directions of the powder recoater.

BRIEF DESCRIPTION OF DRAWINGS

FIG. 1 is a side view showing the arrangement of a powder recoater according to the first embodiment of the present invention;

FIG. 4 shows the states of spreading a powder by the powder recoater according to the second embodiment of the present invention.

DESCRIPTION OF THE EMBODIMENTS

Figure 2:
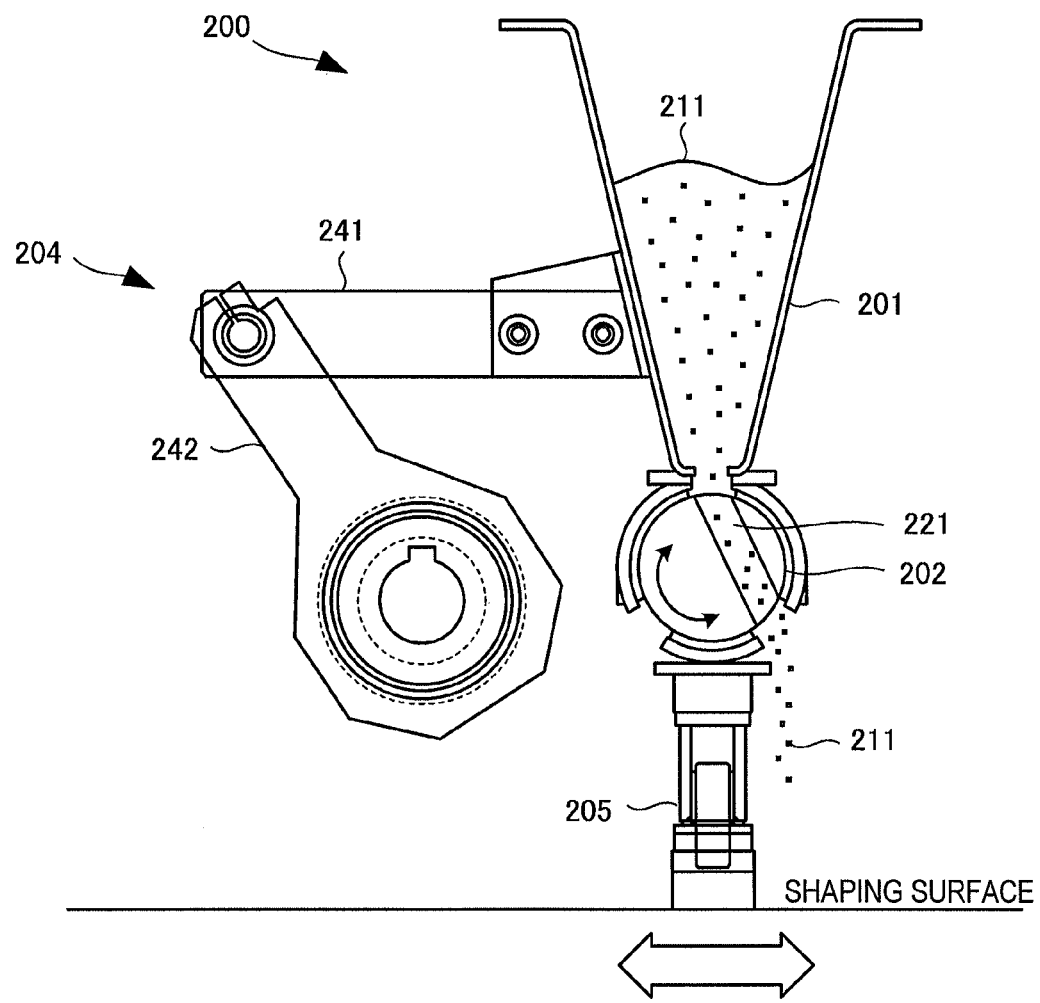
FIG. 2 is a side view showing the arrangement of a powder recoater according to the second embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A powder recoater 100 according to the first embodiment of the present invention will be described with reference to FIG. 1. The powder recoater 100 is a device that spreads a powder 111 to a fabricating surface while moving left and right on the fabricating surface.

As shown in FIG. 1, the powder recoater 100 includes a hopper 101, a powder supply portion 102, and a pivoting unit 103. The hopper 101 stores the powder 111. The powder supply portion 102 has a side surface close to or in contact with the bottom surface of the hopper 101. The powder supply portion 102 has a supply path 121 for the powder 111, and has a cylindrical shape. The center axis of the supply path 121 is displaced from the center axis of the powder supply portion 102 in the radial direction. The pivoting unit 103 causes the powder supply portion 102 to pivot.

According to the first embodiment, the powder supply portion 102 pivots, and the powder 111 can be spread in two directions, that is, the advancement and retraction directions of the powder recoater.

Second Embodiment

Figure 3:
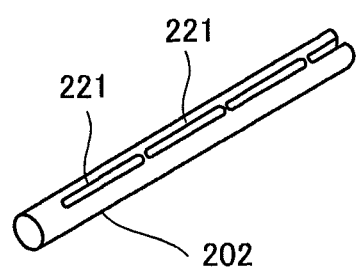
FIG. 3 is a perspective view showing the powder supply portion of the powder recoater according to the second embodiment of the present invention.

A powder recoater 200 according to the second embodiment of the present invention will be described with reference to FIGS. 2 to 4. FIG. 2 is a view for explaining the arrangement of the powder recoater 200 according to this embodiment. FIG. 3 is a perspective view showing a powder supply portion 202 of the powder recoater 200 according to this embodiment.

The powder recoater 200 is a device that spreads a powder 211 to a fabricating surface while moving left and right on the fabricating surface. The powder recoater 200 includes a hopper 201, the powder supply portion 202, a swing portion 204, and a smoothing portion 205. Further, the powder recoater 200 includes a pivoting unit such as a servo motor (not shown).

The hopper 201 stores the powder 211 that is spread to the fabricating surface. Before spreading, the powder 211 is properly supplied in a predetermined amount from, for example, a tank (not shown) that stores the powder 211, and replenishes the hopper 201. The powder 211 is input from an input port at the top of the hopper 201, and supplied to the powder supply portion 202 from a discharge port provided in the bottom surface.

The powder supply portion 202 is provided near the bottom surface of the hopper 201, or provided in contact with the bottom surface. The powder supply portion 202 is a cylindrical member, and a supply path 221 through which the powder 211 passes is provided in the side surface. The supply path 221 is provided so that the center axis of the supply path 221 is displaced and shifted from the center axis of the cylindrical powder supply portion 202 in the radial direction of the powder supply portion 202. The center axis of the supply path 221 is decentered from the center axis of the powder supply portion 202.

The supply path 221 is formed by providing a plurality of holes so as to form a slit, but may be formed from a single hole (single slit). The supply path 221 may also be formed by connecting a plurality of members each having a single hole.

The supply path 221 can have any shape as long as the powder 211 can pass, and can have various shapes such as a circle, ellipse, polygon, and slit. A pivoting mechanism (not shown) such as a servo motor is attached to the powder supply portion 202, and the powder supply portion 202 pivots along with the operation of the servo motor. The powder supply portion 202 can be made of an arbitrary material such as a metal (for example, aluminum, iron, or copper), a plastic, or a resin.

By changing the orientation of the discharge port of the supply path 221 of the powder supply portion 202, the powder 211 can be spread regardless of whether the traveling direction of the powder recoater 200 is the advancement direction or the retraction direction. Since the powder 211 can be spread even in the backward direction, the fabricating time can be shortened.

The swing portion 204 swings the hopper 201 to apply vibrations to the hopper 201 and promote supply of the powder 211 to the supply path 221 of the powder supply portion 202. The swing portion 204 includes a swing arm 241 and a rotation arm 242. The swing arm 241 is connected to the hopper 201. The rotation arm 242 is decentered from the center of rotation. Vibrations generated by rotation of the rotation arm 242 are transferred to the swing arm 241, thereby applying the vibrations to the hopper 201 and promoting the drop of the powder 211.

The smoothing portion 205 smooths the powder 211 spread to the fabricating surface. The powder 211 spread from the powder supply portion 202 drops from the supply path 221 of the powder supply portion 202, and its thickness is not uniform (constant) in a state in which the powder 211 is spread to the fabricating surface. The smoothing portion 205 thus smooths the surface of the powder 211. For example, the powder 211 may be tapped or smoothed by a roller or the like. After the powder 211 is smoothed, it is irradiated by a laser or the like and hardened, manufacturing a three-dimensional shaped object.

FIG. 4 shows the states of spreading the powder 211 by the powder recoater 200 according to this embodiment. In FIG. 4, (a) is a view showing a state in which the powder 211 is spread in the advancement direction. In FIG. 4, (b) is a view showing a state in which the powder 211 is spread in the retraction direction. In FIG. 4, (c) is a view showing a state in which the spread of the powder 211 is stopped.

When the powder recoater 200 advances rightward (advancement direction or forward direction) on the paper surface, as shown in (a) of FIG. 4, the discharge port of the supply path 221 of the powder supply portion 202 is positioned right.

In contrast, when the powder supply portion 202 advances leftward (retraction direction or backward direction) on the paper surface, as shown in (b) of FIG. 4, the discharge port of the supply path 221 of the powder supply portion 202 is positioned left.

By controlling the position of the discharge port of the supply path 221 of the powder supply portion 202, the powder 211 can be spread ahead in the traveling direction of the powder recoater 200.

When stopping the supply of the powder 211, as shown in (c) of FIG. 4, the powder supply portion 202 pivots to position the discharge port of the hopper 201 and the supply path 221 so that they do not communicate straight.

In this manner, the position where the supply path 221 is provided is set at a position shifted in the radial direction from the center axis of the powder supply portion 202. The powder 211 can be spread regardless of whether the powder recoater 200 moves ahead or back.

According to the second embodiment, the fabricating speed is increased because the powder 211 can be spread not only when the powder recoater 200 moves in the traveling direction, but also when it moves in the retraction direction. The powder recoater 200 according to the second embodiment can also be used for a three-dimensional fabricating apparatus.

Third Embodiment

Figure 5:
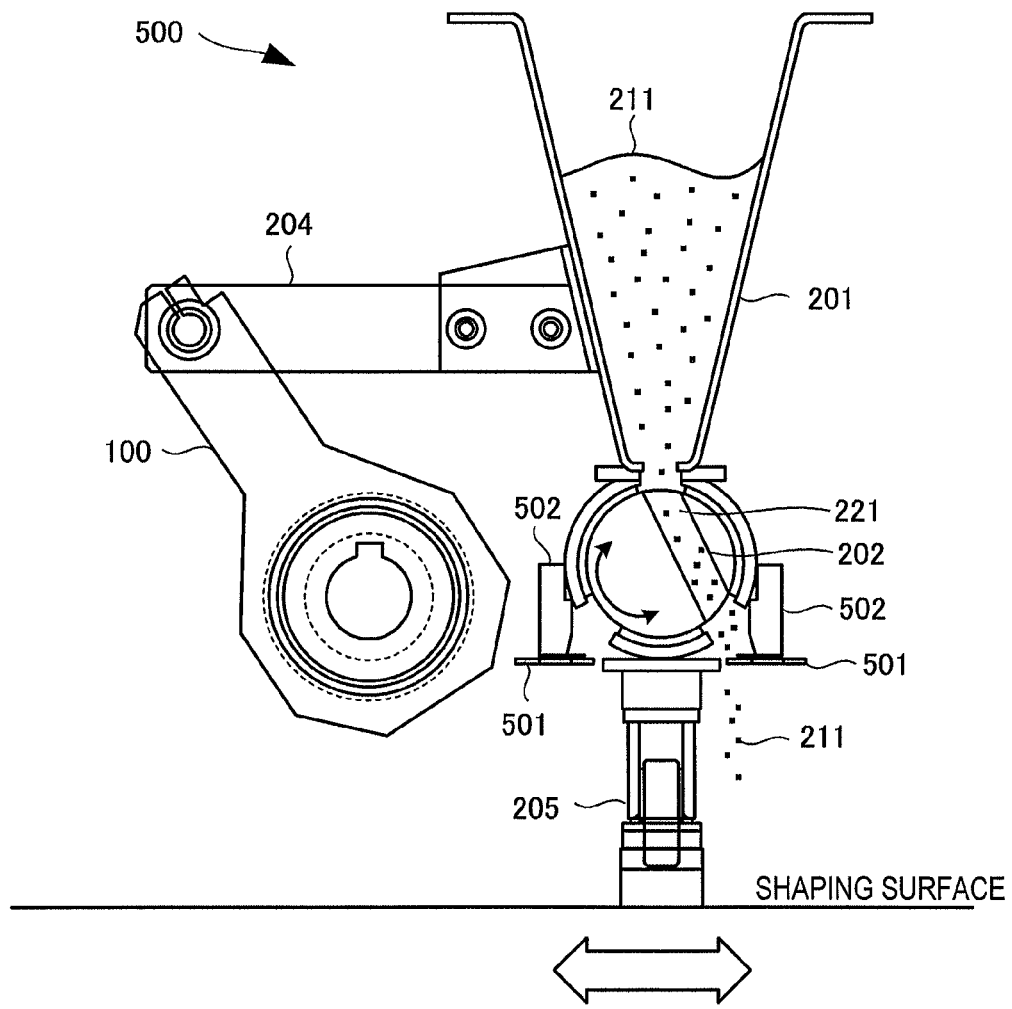
FIG. 5 is a side view showing the arrangement of a powder recoater according to the third embodiment of the present invention.

A powder recoater according to the third embodiment of the present invention will be described with reference to FIG. 5. FIG. 5 is a side view for explaining the arrangement of a powder recoater 500 according to this embodiment. The powder recoater 500 according to the third embodiment is different from the powder recoater according to the second embodiment in that it further includes supply amount adjustment portions 501. The remaining arrangement and operation are the same as those in the second embodiment, so the same reference numerals denote the same arrangement and operation and a detailed description thereof will not be repeated.

The supply amount adjustment portions 501 are provided below a powder supply portion 202, and are provided between the powder supply portion 202 and a fabricating surface. By adjusting the opening of each supply amount adjustment portion 501, the supply amount of a powder 211 to be spread to the fabricating surface can be adjusted. The supply amount adjustment portion 501 functions as a restrictor, and the supply amount of the powder 211 can be increased by increasing the opening, and decreased by decreasing the opening.

The supply amount adjustment portions 501 are arranged on the two sides of the powder recoater 500 on the advancement direction side (forward direction side) and the retraction direction side (backward direction side). The shape of the supply amount adjustment portion 501 may be a shutter-like structure or a plate-like structure, and is arbitrary as long as the drop path of the powder 211 can be closed or opened.

Powder induction portions 502 form a mechanism for inducing the powder 211 so that the powder 211 supplied from the powder supply portion 202 drops toward the supply amount adjustment portions 501. By providing the powder induction portions 502, the powder 211 supplied from the powder supply portion 202 can be prevented from flowing out laterally.

According to the second embodiment, the supply amount adjustment portions 501 are further arranged, and the spread amount of the powder 211 can be adjusted more finely.

Other Embodiments

The present invention has been described above with reference to the embodiments. However, the present invention is not limited to those embodiments. Various changes understandable by those skilled in the art within the scope of the present invention can be made for the arrangements and details of the present invention. The present invention also incorporates a system or apparatus that somehow combines different features included in the respective embodiments.

The invention claimed is:

1. A powder recoater comprising:
   a hopper that stores a powder;
   a cylindrical powder supplier that has a side surface close to or in contact with a bottom surface of said hopper and includes a supply path for the powder; and
   a rotating unit that causes the powder supplier to rotate,
   wherein a center axis connecting an inlet and outlet of the supply path is displaced from an axis of rotation of said powder supplier in a radial direction of said powder supplier, and
   said rotating unit rotates said cylindrical powder supplier in order to bring the outlet of the supply path at a predetermined position corresponding to a traveling direction of said cylindrical powder supplier, before causing said cylindrical powder supplier to travel.

2. The powder recoater according to claim 1, further comprising a supply amount adjuster that is provided below said powder supplier and adjusts a supply amount of the powder supplied from said powder supplier.

3. The powder recoater according to claim 1, further comprising a smoother that smooths a spread powder, said smoother being provided below said powder supplier.

4. The powder recoater according to claim 1, further comprising a vibrator that vibrates said hopper.

5. The powder recoater according to claim 1, wherein said rotating unit is a servo motor.

6. A three-dimensional fabricating apparatus using a powder recoater, said powder recoater comprising:
   a hopper that stores a powder;
   a cylindrical powder supplier that has a side surface close to or in contact with a bottom surface of said hopper and includes a supply path for the powder; and
   a rotating unit that causes the powder supplier to rotate,
   wherein a center axis connecting an inlet and outlet of the supply path is displaced from an axis of rotation of said powder supplier in a radial direction of said powder supplier, and
   said rotating unit rotates said cylindrical powder supplier in order to bring the outlet of the supply path at a predetermined position corresponding to a traveling direction of said cylindrical powder supplier, before causing said cylindrical powder supplier to travel.

7. The three-dimensional fabricating apparatus according to claim 6, wherein said powder recoater further comprises a supply amount adjuster that is provided below said powder supplier and adjusts a supply amount of the powder supplied from said powder supplier.

8. The three-dimensional fabricating apparatus according to claim 6, wherein said powder recoater further comprises a smoother that smooths a spread powder, said smoother being provided below said powder supplier.

9. The three-dimensional fabricating apparatus according to claim 6, wherein said powder recoater further comprises a vibrator that vibrates said hopper.

10. The three-dimensional fabricating apparatus according to claim 6, wherein said rotating unit of said powder recoater is a servo motor.

* * * * *